United States Patent [19]

Ootsuka et al.

[11] Patent Number: 4,616,502
[45] Date of Patent: Oct. 14, 1986

[54] KNOCKING DETECTION SYSTEM FOR INTERNAL COMBUSTION ENGINE

[75] Inventors: Yoshinori Ootsuka; Tadashi Hattori, both of Okazaki; Tadashi Ozaki, Gamagori; Kazuhiko Miura, Aichi, all of Japan

[73] Assignee: Nippon Soken, Inc., Nishio, Japan

[21] Appl. No.: 533,972

[22] Filed: Sep. 20, 1983

[30] Foreign Application Priority Data

Sep. 21, 1982 [JP] Japan ................................ 57-165770
Sep. 21, 1982 [JP] Japan ................................ 57-165771

[51] Int. Cl.$^4$ ............................................. G01L 23/22
[52] U.S. Cl. ............................................. 73/35
[58] Field of Search .................... 73/35; 123/425, 435

[56] References Cited

U.S. PATENT DOCUMENTS

| | | | |
|---|---|---|---|
| 4,153,020 | 5/1979 | King et al. | 73/35 |
| 4,312,214 | 1/1982 | Kramer et al. | 73/35 |
| 4,333,334 | 6/1982 | Nakajima et al. | 73/35 |
| 4,379,403 | 4/1983 | Hattori et al. | 73/35 |

Primary Examiner—Stewart J. Levy
Assistant Examiner—John E. Chapman, Jr.
Attorney, Agent, or Firm—Cushman, Darby & Cushman

[57] ABSTRACT

In a knocking detection system for an internal combustion engine, a knocking is detected by a vibration sensor the output level of which is changed by controlling the sensor excitation current. The excitation current is controlled in dependence upon the output of the sensor, engine speed or load conditions or the like so that the output noise level of the sensor is maintained substantially constant regardless of engine operating conditions.

2 Claims, 9 Drawing Figures

KNOCKING DETECTION SYSTEM FOR INTERNAL COMBUSTION ENGINE

BACKGROUND OF THE INVENTION

The present invention relates to a knocking detection system for an ignition timing control apparatus of an internal combustion engine, which has the functions of detecting a knocking signal generated in or outside of a cylinder due to the internal pressure of the cylinder of the internal combustion engine and regulating the ignition timing so as to suppress the level of knocking below a predetermined value.

Conventionally, an ignition timing control apparatus for internal combustion engines has been proposed in which, taking note of the ignition timing closely related to the generation of knocking, the knocking conditions of the engine are detected while at the same time advancing or delaying the ignition timing according to the knocking conditions, so that the engine is operated under a small knocking condition called "trace knock", thus improving the output or saving the fuel cost.

Figure 1:
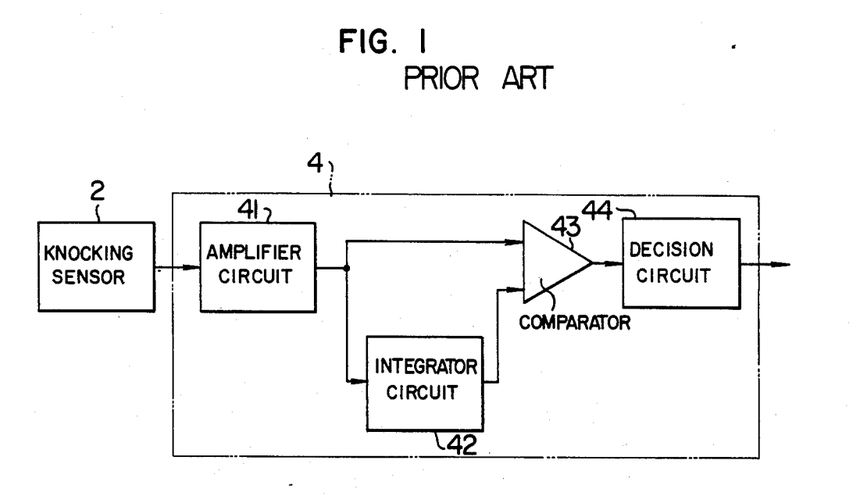
FIG. 1 is a block diagram showing a conventional knocking detection system.

FIG. 1 shows an example of a conventional knocking detection system used with such an ignition timing control apparatus and detecting whether or not a knocking has occurred.

Specifically, reference numeral 2 designates a knocking sensor making up vibration detecting means, which may take any form as long as it is capable of detecting a high-frequency vibration component caused by a knocking. For example, this means may be of a type detecting a knocking from block vibrations, or detecting a sound or a pressure vibration of cooling water, and may employ a configuration disclosed in U.S. Pat. No. 3,822,583.

Numeral 4 designates a knocking detection system the output of which is used to advance or retard the ignition timing. The output of the knocking sensor 2 is amplified to a predetermined voltage level by an amplifier circuit 41.

Figure 2:
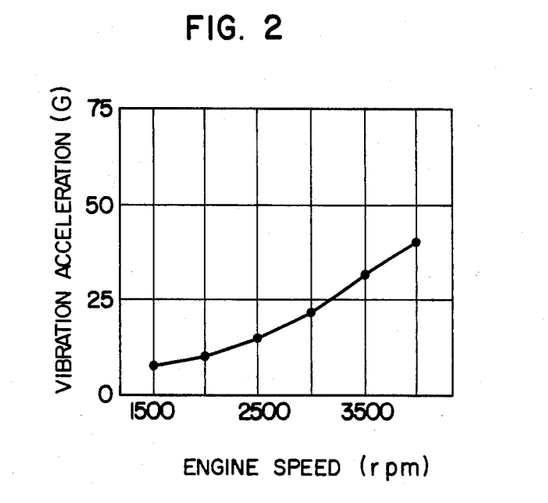
FIG. 2 is a graph illustrating the increase of vibration acceleration with a change of engine speed.

Generally, only when a knocking is generated the high frequency component of the knocking appears at or near the maximum value of the cylinder internal pressure. Regardless of a resonance or non-resonance type, however, the output signal of the knocking sensor contains a vibration noise (such as valve seating noise or ignition noise) appearing at other than the maximum value of the cylinder internal pressure. With an increase of engine speed, the vibration noise increases, thus aggravating the S/N ratio. The effect of the noise is especially great under high engine speed and heavy load conditions. An example is shown in FIG. 2. FIG. 2 illustrates the engine speed of a straight-type 6-cylinder engine, which is changed under full load, and resultant vibration acceleration of the block in the absence of a knocking. This indicates that the noise component undergoes a great change.

In the conventional method of deciding whether or not a knocking has occurred, the output of the amplifier circuit 41 is integrated by an integrator circuit 42 to produce a background noise level, which is compared directly with the output of the amplifier circuit 41 by a comparator 43. Numeral 44 designates a decision circuit for producing a logical level "1" in response to a knocking and a logical level "0" in the absence of a knocking. It is naturally desirable that the noise level be not changed by the engine conditions. Thus the abovementioned variations of noise level becomes a cause of deteriorating the knocking detectability.

SUMMARY OF THE INVENTION

Accordingly, an object of the present invention is to provide a knocking detection system in which the current supplied to the excitation coil of a knocking sensor is controlled according to the output of the sensor so that the sensor output noise levels are maintained at substantially a predetermined level and a good knocking detectability is thus kept under all engine conditions.

Another object of the present invention is to provide a knocking detection system in which the current supplied to the excitation coil of a knocking sensor is controlled according to engine operating conditions so that the sensor output noise levels are maintained substantially at a predetermined level thereby to secure a good knocking detectability under all engine conditions.

DESCRIPTION OF THE PREFERRED EMBODIMENTS

Figure 3:
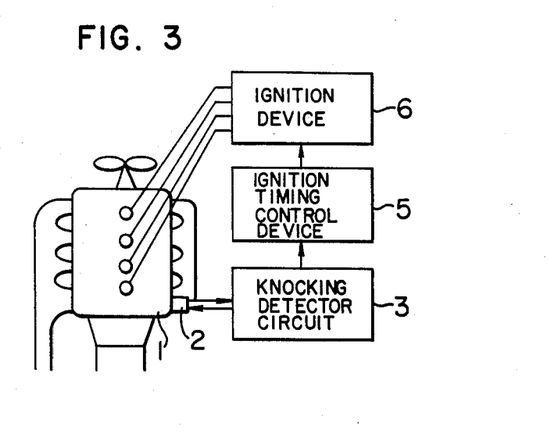
FIG. 3 is a diagram showing a first configuration of a knock feedback ignition system to which the present invention is applied.

In FIG. 3, numeral 1 designates a straight-type 4-cylinder internal combustion engine. A knocking sensor 2 is mounted on the cylinder block of the engine by such means as screws. Numeral 3 designates a knocking detector circuit for detecting a knock of the engine in response to an output signal of the knocking sensor 2. Numeral 5 designates an ignition timing control device for controlling the ignition timing to an optimum value by advancing or retarding the same in dependence upon the output of the circuit 3. The output signal of this control device 5 is applied through an ignition device 6 such as an ignition coil and distributor to thereby ignite the air-fuel mixture by means of a spark plug mounted on the engine. The detailed constructions of the ignition timing control device 5 and the ignition device 6 which are well known will not be explained.

Figure 4:
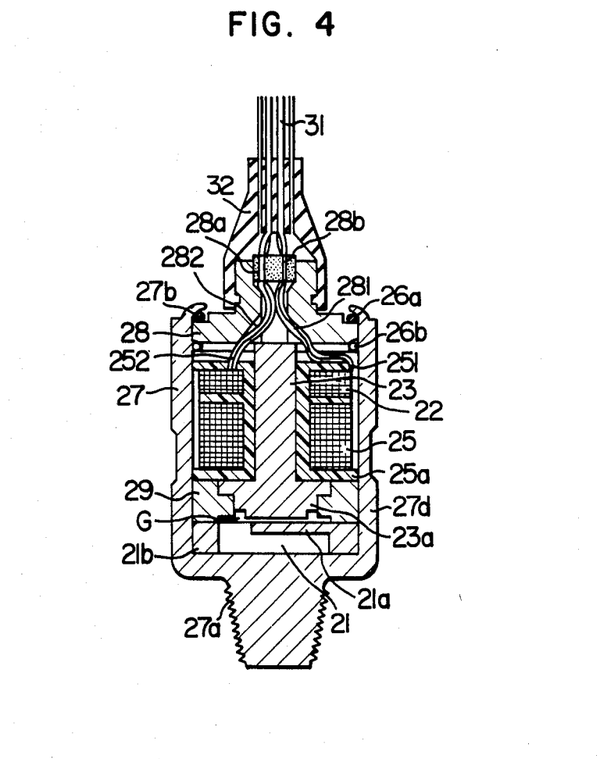
FIG. 4 is a longitudinal sectional view showing knocking sensor used with the system according to the present invention.

Now, the knocking sensor 2 will be described in detail. A sectional view of this sensor is shown in FIG. 4. In this drawing, numeral 21 designates a vibrator including a tabular reed 21a having a resonance point at 5 to 10 KHz of knocking frequency and a ring or annular holder 21b for holding the reed 21a, integrated with each other by a magnetic material (such as iron, iron-nickel alloy or a magnetic stainless steel such as SUS430). An end of the reed member 21a is held by the holder 21b. Numeral 22 designates an excitation coil making up magnetic flux generator means, and numeral 23 an axially-extending magnetic circular post member of iron, iron-nickel alloy or like, which has a flange portion 23a at the lower end thereof opposing the reed member 21a to form a gap G with the reed member 21a. This magnetic circular post member 23 makes up a central magnetic path.

Numeral 25 designates a detection coil making up magnetic flux detector means wound on the magnetic member 23 through a resin bobbin 25a. The excitation coil 22 is also wound on the magnetic post member 23 through the bobbin 25a. The holder 21b for the vibrator 21 is bonded to the inner bottom of a cupshaped housing 27. Numeral 29 designates an annular spacer of aluminum copper alloy or non-magnetic stainless steel, the lower end of which is closely attached to the holder 21b of the vibrator 21. The intermediate portion of this spacer 29 holds the flange portion 23a of the magnetic circular post member 23, while the upper end thereof supports the flange portion 23a and the bobbin 25a. The spacer 29, which is a non-magnetic material, is designed to have a magnetic reluctance sufficiently high as to be almost equivalent to the air gap. The housing 27 has a substantially cylindrical peripheral wall made of iron, iron-nickel alloy or other magnetic material. The lower part of this housing 27 includes a block-mounting screw 27a and a hexagonal portion 27d to fit a wrench for fastening the housing 27 to the engine block by means of the screw 27a.

Numeral 28 designates a seal plate for protecting the body of the sensor from external conditions, atmospheric humidity and contaminations. This seal plate, making up a part of the magnetic paths, is of a magnetic material thrust into the opening of the housing 27 and fixed by caulking the caulking portion 27b of the opening of the housing 27 through an O-ring seal 27b. This plate 28 fixedly carries a hermetic seal 28a with a terminal 28b fixedly embedded for taking out a signal. Ends of the coils 22 and 25 are connected to the terminal 28b, which is connected to an external signal line 31. Numeral 32 designates a rubber bushing for covering connecting portions of the signal line 1 and the terminal 28b, and numeral 26b an O-ring interposed between the plate 28 and the bobbin 25a.

The lower end of the plate 28 is in close contact with the magnetic circular post member 23. The housing 27, except the periphery of the vibrator 21, is filled with mold resin as required to thereby prevent the interlinkage magnetic fluxes from changing with change of relative positions of the coils 23, 25 and the magnetic member 23. Numerals 251, 252 designate slits or grooves formed in the bobbin 25a for taking out the ends of the coils 22 and 25. Numerals 281, 282 designate slits or grooves formed in the plate 28 for taking out the ends of the coils 22 and 25. In this sensor, the magnetic flux generated in the excitation coil 22 passes from the magnetic member 23 to gap G to vibrator 21 to housing 27 to plate 28 back to magnetic member 23.

Figure 5:
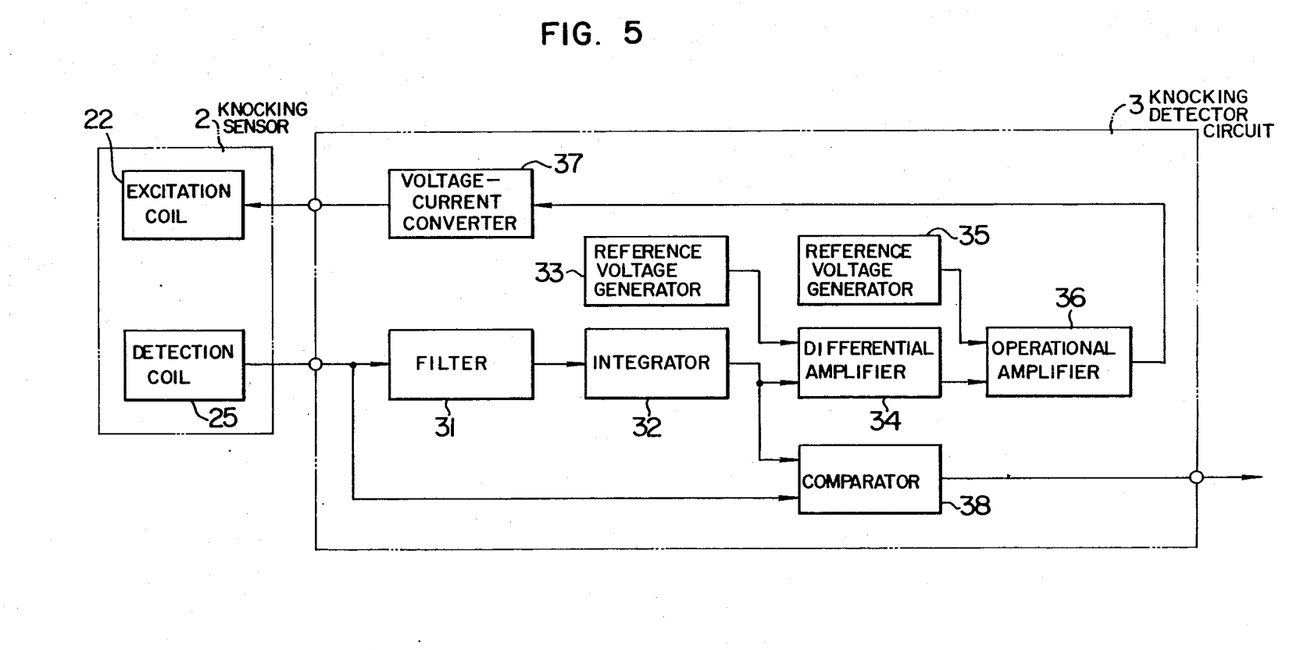
FIG. 5 is a block diagram showing a first embodiment of a knocking detector circuit according to the present invention.

Reference is made to FIG. 5 showing an embodiment of the knocking detector circuit 3 responsive to the output of the sensor 2 for detecting whether a knocking has occurred and controlling the current supplied to the excitation coil 22.

The output of the detection coil 25 of the knocking sensor 2 is applied to a filter circuit 31 for filtering out components other than knocking frequencies, and then is integrated by an integrator circuit 32 to produce a background noise level. Numeral 33 designates a reference voltage generator circuit for generating a DC voltage corresponding to a predetermined integrated noise level. The difference between the output of the reference voltage generator circuit 33 and that of the integrator circuit 32 is equal to the difference of noise level to be corrected. This voltage difference is amplified to a predetermined level by a differential amplifier circuit 34.

Numeral 35 designates a reference voltage generator circuit for generating a reference voltage corresponding to a reference excitation current to be supplied to the excitation coil 22, which is predetermined for a selected engine operating condition. Numeral 36 designates an operational amplifier circuit whereby the outputs of the reference voltage generator circuit 35 and the differential amplifier circuit 34 are subjected to an operational amplification such that a voltage corresponding to a current value to be corrected is added to or subtracted from the reference voltage corresponding to the predetermined reference current value. Numeral 37 designates a voltage-current converter circuit for supplying electric current to the excitation coil. A comparator circuit 38 is provided to identify the occurrence of a knocking by comparing the output of the integrator circuit 32 with the output of the detection coil 25.

The operation of each part will be explained with reference to FIG. 6. First, reference is made to the case where the excitation current is not controlled. Generally, with an increase of engine speed, the output noise level of the knocking sensor 2 increases. In the conventional system shown in FIG. 1, the output of the integrator circuit 42 increases with an increase in engine speed.

Now, assume that the excitation current is controlled. The reference voltage generator circuit 33 generates a voltage corresponding to the integration of the noise level controlled to a predetermined level in advance, so that the difference between the output of the integrator 32 and the output of the reference voltage generator circuit 33 corresponds to the difference of the excitation current to be corrected. These two outputs are subjected to the operational amplification at the differential amplifier circuit 34. The reference voltage generator circuit 35 generates in advance the reference voltage corresponding to the reference excitation current to the excitation coil. In other words, this reference voltage corresponds to a current to be applied to the excitation coil in the case where such a correction is not required. When a definite correction is required for the reference current, the output of the differential amplifier circuit 34 is added to or subtracted from the output of the circuit 35 by the operational amplifier circuit 36 to produce a voltage corresponding to the corrected excitation current. The voltage finally corrected is converted into a current at the voltage-current converter circuit 37 and then supplied to the excitation coil 22. Even when the output noise level of the knocking sensor 2 increases with engine speed as shown in FIG. 6, the excitation current is therefore decreased to maintain the noise level substantially constant.

In order to make a decision as to whether or not a knocking has occurred, the output of the integrator circuit and the output of the detection coil 25 of the knocking sensor 2 are directly compared with each other at the comparator circuit 38, so that the comparator 38 produces a logical level "1" in the presence of a knocking, and a logic level "0" in the absence of a knocking, both logic levels being applied to the ignition timing control device 5.

As explained above, in the knocking detection system according to the above-mentioned embodiment, the current supplied to the excitation coil of the knocking sensor is controlled according to the output of the detection coil thereby to maintain the output noise levels of the detection coil at a substantially constant value, thus achieving a high knocking detectability even when the sensitivity of the knocking sensor or the engine operating conditions undergo a change.

Figure 7:
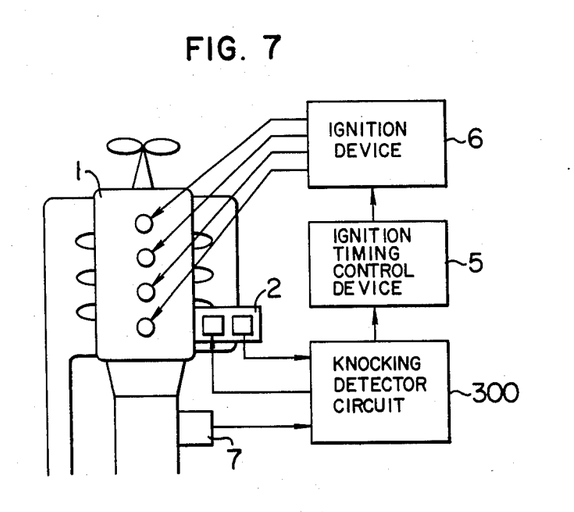
FIG. 7 is a diagram showing a second configuration of the knock feedback ignition system.

Now, explanation will be made of another embodiment in which the output of the knocking sensor 2 is used for detection of a knocking and an engine speed representing the engine operating condition is detected to control the excitation current to the excitation coil. FIG. 7 shows a second configuration of a knock feedback ignition system to which the present embodiment is applied. Unlike in FIG. 3, the system in FIG. 7 includes an engine condition detector 7 the output of which is applied to a knocking detector circuit 300. The engine condition detector 7 in this embodiment is for detection of engine speed, and may take any form so long as a predetermined number of pulses is generated in synchronism with engine speed. The knocking detector circuit 300 is illustrated in detail in FIG. 8. Numeral 340 designates a frequency-voltage converter circuit for counting the pulses generated by the engine condition detector 7 and converting them into voltage proportional to engine speed. Numeral 350 designates a differential amplifier circuit including a reference voltage generator circuit the output of which decreases with an increase of engine speed. Numeral 360 designates a voltage-current converter circuit for supplying an excitation current to the excitation coil 22 of the knocking sensor 2. An engine load condition detecting means 7.1 also can provide input to the frequency-voltage converter circuit 340.

Figure 8:
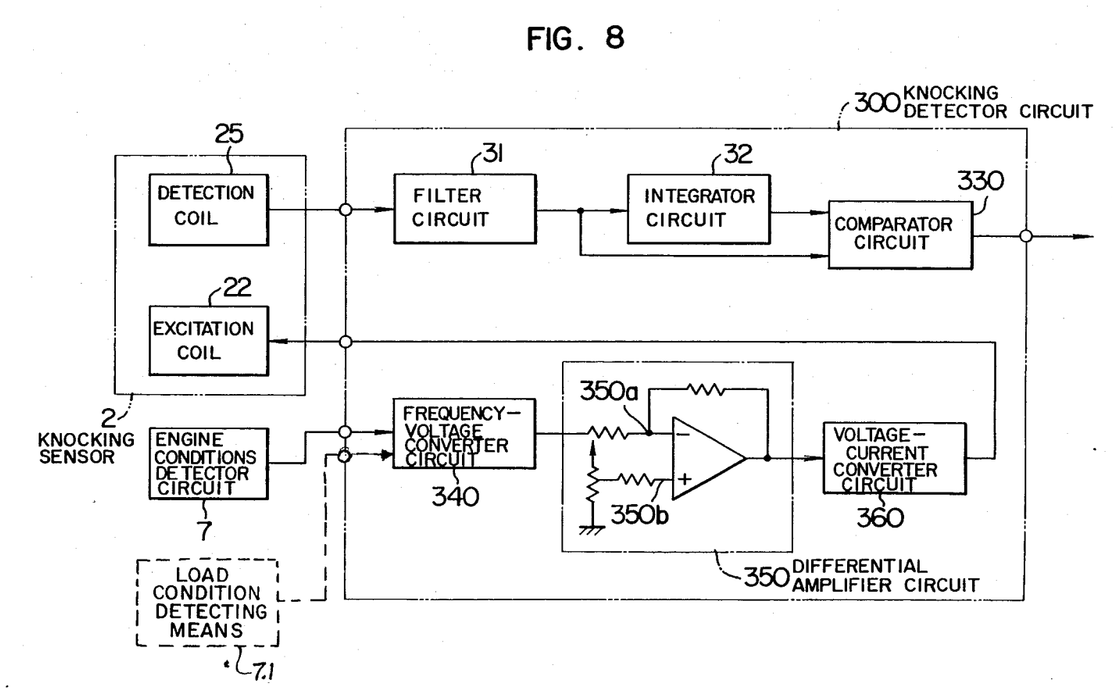
FIG. 8 is a block diagram showing a second embodiment of the knocking detector circuit according to the present invention.

Numeral 31 designates a filter circuit for filtering out valve seating noises and ignition noises from the output of the detection coil 25 of the knocking sensor 2 and producing knocking component alone. Numeral 32 designates an integrator circuit for producing a background noise level. Numeral 330 designates a comparator circuit for comparing the output of the filter circuit 31 directly with the background noise level thereby to decide on whether or not a knocking has occurred.

Figure 6:
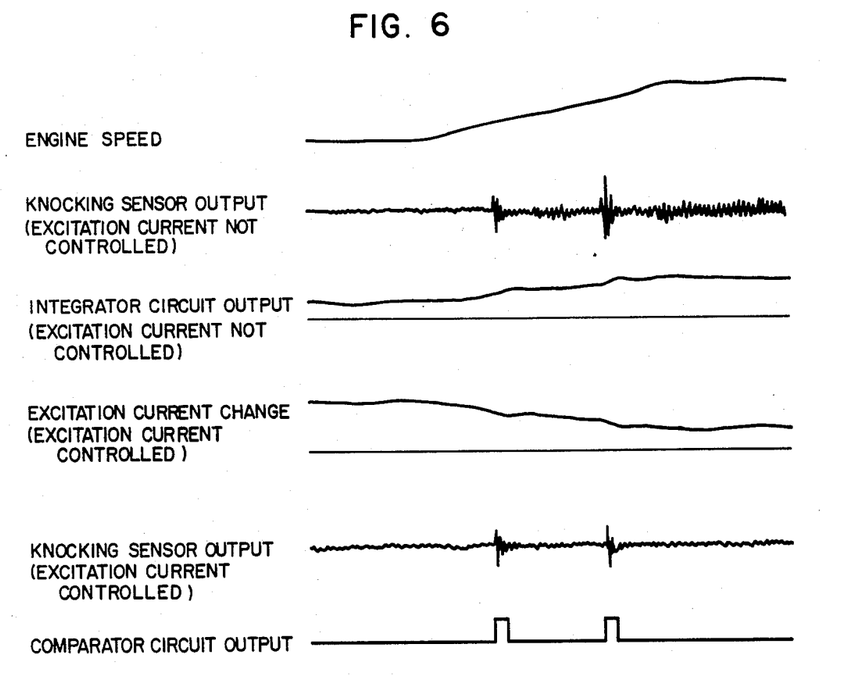
FIG. 6 shows output waveforms produced at various parts of the detector circuit in the presence or absence of the excitation current of the knocking sensor.

For this embodiment, FIG. 6 shows the output change of the integrator circuit and the output change of the knocking sensor with engine speed depending on whether the excitation current is controlled or not. First, reference is made to the case where the excitation current is not controlled. It is seen from FIG. 6 that the noise level in the output of the knocking sensor 2 generally increases with engine speed. As a result, according to the conventional system of FIG. 1, the output of the integrator circuit 42 increases with an increase of engine speed, as explained above.

Figure 9:
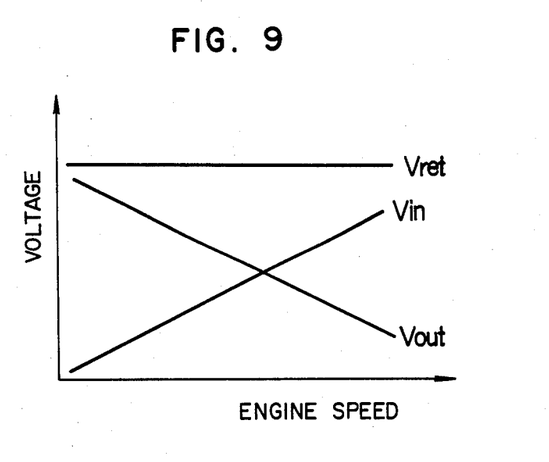
FIG. 9 is a characteristic diagram showing voltages at various parts of a differential amplifier of the knocking detector circuit.

Next, assume that the excitation current is controlled. A rotational signal containing 360 pulses per one revolution produced by the engine condition detector 7 is converted into a DC voltage proportional to engine speed by the frequency-voltage converter circuit 340. This DC voltage Vin is applied to the inverting input terminal 350a of the differential amplifier circuit 350. In other words, FIG. 9 shows the voltage Vin applied to the inverting input terminal 350a against engine speed. The non-inverting input terminal 350b of the amplifier circuit 350, on the other hand, is impressed with a voltage Vref sufficiently higher than the DC voltage Vin as a predetermined reference voltage against engine speed. Consequently, the output of the differential amplifier circuit 350 takes the form of an output Vout proportional to the difference Vref−Vin of the two voltages. This voltage Vout, which decreases with an increase of engine speed, is converted into a current output by a voltage-current converter 360 to thereby supply an excitation current to the excitation coil 22 of the knocking sensor 2. As shown in FIG. 6, therefore, the excitation current decreases with an increase of engine speed, so that noise level in the output of the knocking sensor can be maintained substantially constant.

Whether a knocking has occurred or not is determined in such a manner that after separating the components other than knocking components from the output of the detection coil 25 of the knocking sensor 2 by the filter circuit 31, the knocking components are applied to and integrated at an integrator circuit 32 to produce a comparison voltage for a comparator circuit 330, which comparison voltage is compared with the output of the filter circuit 31 directly. The comparator circuit 330 produces a logic "1" in the presence of a knocking, and a logic "0" in the absence thereof.

In this case, as described already, the excitation current supplied to the excitation coil is controlled so as to decrease with an increase of engine speed, so that the output of the integrator circuit 32 is maintained substantially constant regardless of change of engine speed.

The embodiment described above has the advantage that, by controlling the excitation current supplied to the excitation coil of the knocking sensor according to engine conditions to maintain the noise levels of the detection coil substantially constant, the knocking detectability is maintained high regardless of change of engine conditions.

Further, unlike in the above-mentioned embodiment in which the current supplied to the excitation coil of the knocking sensor is controlled against engine speed most affecting the noise level of the knocking sensor, the excitation current may be further controlled, of course, in view of load conditions with a great effect.

We claim:

1. A knocking detection system for an internal combustion engine, comprising:
vibration detector means for producing in response to engine vibrations a controllable electrical output signal representing a knocking component of said engine vibrations in the presence of knocking and a noise component of said engine vibrations in the absence of a knocking wherein said vibration detector means includes a magnetic path with a magnetic gap changing in accordance with vibrations of said engine, excitation coil means for driving magnetic flux of said magnetic path, and detection coil means for detecting change of magnetic flux caused with change of said magnetic gap;
means for deriving the noise-component from said controllable electrical output signal;
means for producing a knocking detection signal in response to said knocking component of said electrical output signal; and
feedback control means responsive to the derived noise component for controlling said vibration detector means to maintain the level of the derived consequent noise component substantially constant regardless of engine operating conditions, thereby enhancing the knocking/noise component ratio of said output signal during engine operating conditions which would otherwise increase said noise component wherein said feedback control means includes an integrator circuit for integrating an output of said detection coil means, and a variable current source for changing excitation current supplied to said excitation coil means to maintain the integrated output of said integrator circuit substantially constant.

2. A knocking detection system for an internal combustion engine, comprising:

knocking sensor means for sensing an engine knocking condition, said sensor means comprising a magnetic path, an excitation coil means for controllably causing magnetic flux to flow through said magnetic path, a magnetic air gap changeable with vibration of said engine to change said magnetic flux, and detection coil means for detecting said change in said magnetic flux due to change in said air gap and outputting a signal indicative thereof; and knocking detection circuit means for detecting presence or absence of an engine knock in response to said sensor means, said detection circuit means including feedback control means for receiving said output signal from said detection coil means and changing an excitation current to be supplied to said excitation coil means to maintain a constant noise level of said engine vibration even during engine conditions which would otherwise increase said noise level, thereby enhancing the knocking/noise ratio so as to improve knock detection.

* * * * *